Sept. 7, 1965   D. M. MAYTNIER   3,205,328
THERMALLY ACTUATED SINGLE-THROW SNAP-ACTION SWITCH
Filed July 13, 1962

INVENTOR.
DAVID M. MAYTNIER
BY
Sheedy & Sheedy
HIS ATTORNEYS.

3,205,328
THERMALLY ACTUATED SINGLE-THROW
SNAP-ACTION SWITCH
David M. Maytnier, 2510 Ridge Road, Evanston, Ill.
Filed July 13, 1962, Ser. No. 209,698
3 Claims. (Cl. 200—138)

My invention relates to a new and useful improvement in a thermally actuated single-throw snap-action switch and more particularly to a heat responsive switch having a positive movement of its switch blade.

A principal object of my invention is in the provision in a switch of this character of a heat responsive disc yieldably restrained, yet freely movable within a housing having a preformed configuration which when subjected to heat radically changes and thus causes the actuation of a movable switch blade.

A further object of my invention is in the provision in a switch of this character of a yieldable switch blade having operative connection through a non-conductive element with a heat responsive element whereby through the reaction of the element the switch blade is moved into and out of engagement with an electrical contact.

Another object of my invention is in the provision of a non-heat-conductive movable connector yieldably held by and between a heat responsive element and a spring finger provided by a movable switch blade, with the movable connector adapted to transmit movement of the heat responsive element through the spring finger on to the movable switch blade until the latter is caused to move into and out of engagement with an electrical contact.

Yet another object of my invention is in the provision in a switch of this character of an arrangement of parts the construction of which permits the parts to be assembled without the use of screws, rivets, nuts and bolts, and the like.

Still another object in my invention is in the provision of a switch of this character of an arrangement of a minimum number of parts that are simple in construction, economical in manufacture and highly efficient in use.

Other objects will appear hereinafter.

The invention consists in the novel combination and arrangements of parts to be hereinafter described and claimed.

The invention will be best understood by reference to the accompanying drawings showing the preferred form of construction, and in which.

As shown in the accompanying drawings, the preferred form of my switch includes a ring-like casing 10, having a lateral flange 11. This flange 11 is notched to provide diametrically opposed recesses 12 and 13.

Figure 3:
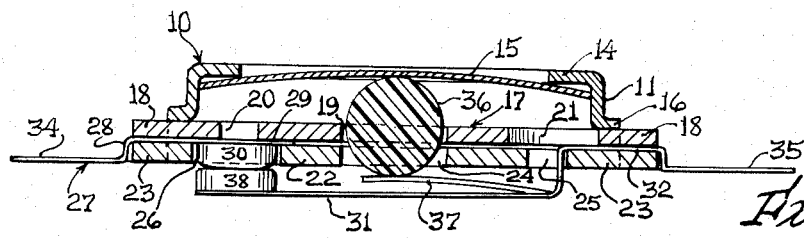
FIG. 3 is a side sectional detailed view of my improved thermal switch.

The casing 10 provides an inwardly extending lip 14. Positioned within the casing 10 and beneath the lip 14 is a heat responsive disc 15. The disc 15 is preferably formed in a convex condition such as is shown in FIG. 3. In such a condition, the crest of the convexed surface lies in the same plane as the inturned lip 14.

Figure 1:
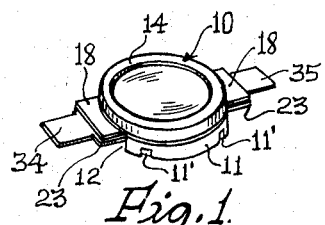
FIG. 1 is a perspective view of my improved thermal switch.
Figure 2:
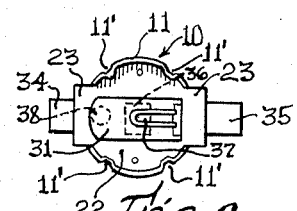
FIG. 2 is a plan bottom view of my improved thermal switch.
Figure 4:
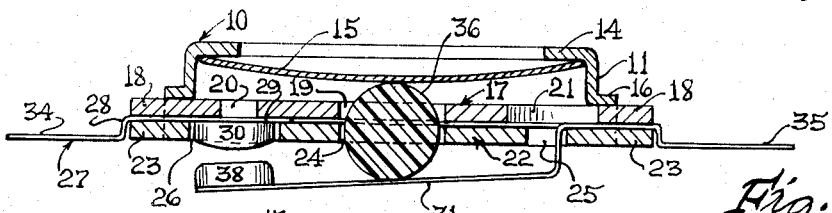
FIG. 4 is a side sectional detailed view of my switch in an actuated position.
Figure 5:
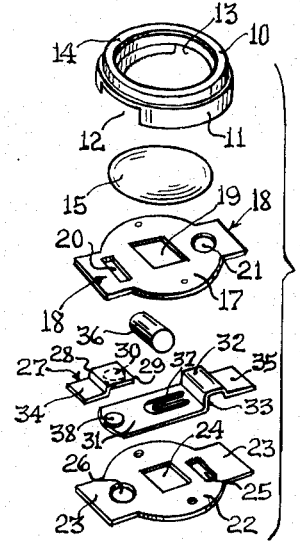
FIG. 5 is a perspective view of the parts of my switch in an exploded relation.

The flange 11 of the casing 10 is provided with an outwardly extending circumferential ridge 16 which provides a seat for a non-conductive wafer 17. This wafer 17 provides laterally extending arms 18 which are adapted to extend outwardly of the casing 10 through the recesses 12 and 13. The non-conductive wafer 17 is provided with a center opening 19. To one side of the center opening 19 is formed a slot 20, while on the other side of the center opening 19 there is formed a circular aperture 21. A like non-conductive wafer 22 having corresponding laterally extending arms 23 is adapted to lie in facial abutment with the wafer 17 and form a rear wall for the casing 10 as seen in FIGS. 2, 3, and 4. The flange 11 can then be swedged as at 11' to retain the wafers 17 and 22 within the casing 10. The wafer 22 is likewise provided with a center opening 24, a slot 25 to one side thereof and a circular aperture 26 to the other side thereof. In positioning the wafer 22 in facial abutment with the wafer 17, it is seen that the center openings 24 and 19 thereof are in open communication while the slots 25 and 20 and the circular apertures 21 and 26 are positioned in non-alignment.

As shown by the drawings, the preferred form of construction of my thermal switch is of the normally closed type. To this end I provide a terminal member 27 which is kinked as at 28 to provide an offset portion 29 which carries a contact 30. The kink 28 is of a width equal to the thickness of the insulated wafer 22 and the contact 30 on the offset portion 29 of the terminal 27 is adapted to be projected through the circular aperture 26 formed in the insulated wafer 22, the offset portion 29 being disposed between the wafers 17 and 22, as seen in FIGS. 3 and 4.

A second terminal 31 is bent intermediate its ends to provide a U-shaped socket 32. The socket 32 is adapted to sit between the wafers 17 and 22 and has one arm 33 thereof inserted through the slot 25 formed in the wafer 22.

By the preferred construction just described, the free end 34 of the terminal 27 and the free end 35 of the terminal 31 will extend laterally from the casing 10 between the arms 18 and 23 of the insulated wafers 17 and 22 respectively and will be coplanar with the bottom surface of the wafer 22.

Positioned within the center openings 19 and 24 formed in the insulated wafers 17 and 22 is an actuator 36. This actuator 36 is preferably cylindrical in cross section and made of a ceramic or plastic material so that it is not susceptible to transmitting heat and is non-conductive with respect to the transmitting electrical current therethrough. Struck from the terminal 31 is a spring finger 37. This spring finger 37 extends in the general direction of the openings 19 and 24 formed in the insulated wafers 17 and 22 and yieldably bears against the actuator 36 as seen in FIG. 3. This spring finger 37 not only yieldably maintains the actuator 36 in contact with the heat responsive disc 15 but normally retains the disc 15 beneath the lip 14 of the casing 10 as viewed in FIG. 3.

In response to a certain amount of external heating the disc 15 will snap into a concaved configuration within the casing 10 into the position shown in FIG. 4. By this movement the disc 15 forces the actuator 36 transversely of the insulating wafer plates 17 and 22 and moves against the yieldable spring tension of the spring finger 37 until it engages the terminal 31 as seen in FIG. 4. In this position the disc 15 and actuator 36 has caused the terminal 31 to flex to such a degree that the contact 38 carried at one end thereof is moved out of contact with the stationary contact 30 of the terminal 27. The switch will remain in this condition until the disc 15 is no longer responsive to any external heating at which time the disc 15 will snap back into its original condition, this being a convexed condition as viewed in FIG. 3. This action of the disc 15 is aided and yieldably followed by the pressure of the terminal 31 and spring finger 37 against the actuator 36.

It is readily apparent that the heat responsive disc 15 can be formed from any suitable bi-metal material and thus can be made responsive to different degrees of temperature. The disc 15 may be reversely inserted in the ring-like casing 10 so as to operate the switch in such a manner that the contacts will be closed instead of opened when the proper temperature has been reached. It should also be noted that in the preferred form of construction the insulated wafers 17 and 22 are identical in construction and configuration and need only be reversed when employed in assembling the switch hereinbefore described. The employment of identical insulated wafers simplifies the act of assembling the parts of the switch and materially reduces the cost of manufacturing the same.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A thermal switch comprising
   (a) a casing having an opening formed in the top wall thereof,
   (b) a concave heat-responsive element fitted in said casing with its concavity protruding into said opening,
   (c) conductive terminal members carried by and extending from opposite corresponding sides of said casing and having overlapping portions within said casing in spaced confronting relation with respect to each other,
   (d) means connected to said casing and insulating said terminal members from each other,
   (e) contact members on the confronting sides of said overlapping portions and normally in contact with each other,
   (f) a non-conductive actuator movably disposed within said casing and between said heat-responsive element and one of said terminal members,
   (g) a spring finger struck from said one terminal member for yieldably bearing said actuator into contact with said heat-responsive element for maintaining the concavity thereof within said opening of said casing,
   (h) said heat-responsive element reversing its concavity within said casing against said actuator so as to flex with a snap action said spring finger and said one of said terminal members to disengage said contact members from contact with each other.

2. A thermal switch as defined in claim 1 wherein the means connected to said casing and insulating said terminal members from each other comprises a pair of non-conductive plates arranged in facial abutment with respect to each other with portions of said terminal members disposed therebetween.

3. A thermal switch comprising
   (a) a casing having a centrally located opening formed in the top wall thereof,
   (b) a concave heat-responsive element fitted in said casing with its concavity protruding into said opening,
   (c) a pair of non-conductive plates arranged in facial abutment with respect to each other within said casing and having a central opening formed therethrough,
   (d) conductive terminal members arranged between said plates and extending from opposite corresponding sides of said casing and having overlapping portions in spaced confronting relation with respect to each other,
   (e) contact members on the confronting sides of said overlapping portions and normally in contact with each other,
   (f) one of said plates having an opening formed therein in which one of said contact members is confined,
   (g) a non-conductive actuator movably disposed within said central openings of said plates between and in contact with said heat-responsive element and one of said terminal members,
   (h) a spring finger struck from said one terminal member for yieldably bearing said actuator into contact with said heat-responsive element for maintaining the concavity thereof within said opening of said casing,
   (i) said heat-responsive element reversing its concavity within said casing against said actuator so as to flex with a snap action said spring finger and said one of said terminal members to disengage said contact members from contact with each other.

References Cited by the Examiner

UNITED STATES PATENTS

| 2,239,540 | 4/41 | Spencer | 200—138 |
| 2,456,153 | 12/48 | Schell | 200—122 |
| 2,717,936 | 9/55 | Bolesky | 200—138 |
| 2,954,447 | 9/60 | Bolesky et al. | 200—138 |
| 3,005,076 | 10/61 | Mertler | 200—138 |
| 3,139,500 | 6/64 | Fallon et al. | 200—138 |

FOREIGN PATENTS

| 625,675 | 2/36 | Germany. |
| 657,434 | 9/51 | Great Britain. |

BERNARD A. GILHEANY, *Primary Examiner.*

ROBERT K. SCHAEFER, *Examiner.*